Dec. 21, 1937.    G. W. SPOUSTA    2,102,859
CHEESE SLICING AND DISPENSING APPARATUS
Filed May 15, 1937    6 Sheets-Sheet 1

INVENTOR.
George W. Spousta

Dec. 21, 1937.   G. W. SPOUSTA   2,102,859
CHEESE SLICING AND DISPENSING APPARATUS
Filed May 15, 1937   6 Sheets-Sheet 2

INVENTOR.
George W. Spousta

Dec. 21, 1937.  G. W. SPOUSTA  2,102,859
CHEESE SLICING AND DISPENSING APPARATUS
Filed May 15, 1937  6 Sheets-Sheet 3

INVENTOR.
George W. Spousta

Dec. 21, 1937.  G. W. SPOUSTA  2,102,859
CHEESE SLICING AND DISPENSING APPARATUS
Filed May 15, 1937  6 Sheets-Sheet 5

INVENTOR.
George W. Spousta

Dec. 21, 1937.   G. W. SPOUSTA   2,102,859
CHEESE SLICING AND DISPENSING APPARATUS
Filed May 15, 1937   6 Sheets-Sheet 6

INVENTOR.
George W. Spousta

Patented Dec. 21, 1937

2,102,859

UNITED STATES PATENT OFFICE 2,102,859

CHEESE SLICING AND DISPENSING APPARATUS

George W. Spousta, Oak Park, Ill.

Application May 15, 1937, Serial No. 142,846

14 Claims. (Cl. 31—21)

My invention relates to slicing machines and similar devices.

My invention relates more particularly to slicing machines capable of slicing and dispensing cheese or other materials which are ordinarily more difficult to handle than the usual types of material which is sliced, although it will be understood that it also relates to an improved machine of general application.

The principal object of my invention is to provide an improved cheese slicing and dispensing apparatus.

A further object of my invention is to provide an improved device of the class described, so constructed that it will be possible to quickly and easily slice cheese or similar material in slices of even thickness.

A further object of my invention is to provide an improved device of the class described, capable of adjustment to provide slices of any desired thickness.

A further object of my invention is to provide improved apparatus of the class described that is simple in construction, easily operated, and incapable of becoming broken or worn out even though subjected to hard and rough usage.

A further object is to provide an improved construction of hopper or material supporting magazine in apparatus of the class described, that is capable of back and forth movement with a minimum of friction.

A further object is to provide an improved hopper capable of manual manipulation to firmly grasp the loaf or block of cheese or other material at a point adjacent the lower edge thereof.

A further object is to provide an improved hopper so constructed and arranged that the same may be easily and quickly tilted over so that small portions of the material therein may be forced from said hopper by upward pressure from the lower end thereof, or forced downwardly through the lower end, yet which in operation is securely locked against tilting.

A further object of my invention is to provide an improved slice gauge construction in apparatus of the above-mentioned type.

A further object is to provide a slice gauge having indicia associated therewith so that the weight of a given slice can be predetermined.

A further object is to provide an improved construction and arrangement for supporting a hopper and gauge, and improved means for receiving and dispensing material that has been sliced.

A further object is to provide improved mechanical means for adjusting the measuring gauge to secure slices of a desired thickness.

Other objects and advantages will be more apparent from the following description wherein reference is had to the accompanying several sheets of drawings, upon which—

In the preferred embodiment of my improved apparatus I have shown a base member 10 having an upper sloping wall 12 and vertical side walls 14. The side walls are outwardly flanged at their lower extremity and provide means for attaching a plurality of foot members 18. The foot members 18 may be in the form of rubber suction cups secured to the flange 16 by suitable bolt members 20.

At the forward end of the base 10 I provide a downwardly projecting flange member 22 for abutment against the side of a table T upon which the apparatus has been placed.

The frame of the apparatus may consist generally of the vertical side members 24 and 26 secured to the upper wall 12 of the base by suitable screw members 27. The side wall members 24 and 26 are provided at their outer ends with a pair of upwardly turned bearing members 28 and 30 to suitably support rail members 32 and 34.

At the forward end of the device and generally near the top of the side frame members, I have shown a cutter member 36 suitably secured between the side frame members upon downwardly turned flanges 38 and 40. The cutter member 36 may have a diagonal knife portion 42 for a purpose which will presently be apparent.

I have provided a gauge member for determining the thickness of slices desired, and in connection therewith I provide a suitable holder 44 positioned between the side frame members 24 and 26. This holder may comprise a pair of flat side bars 46 and 48 connected at their forward end by a cross bar 50.

The cross bar 50 and the side bars 46 and 48 are each formed with slots 51, 52, 53, 54 and 56 and are so arranged that a suitable gauge member 58 may be inserted through the end wall 50 and be supported in the holder.

As can be seen, the gauge is formed with a diagonal forward edge 60 and is capable of being removed from any one of the slots and inserted into any other one to determine the thickness of a slice.

I provide means for automatically preventing the withdrawal of the gauge member 58 during a slicing operation. This may comprise the lever member 60' pivotally mounted upon the end of rail member 34 and extending downwardly to a point adjacent the lower edge of the gauge holder, at which point a weight member 62 is provided thereon. As thus pivotally mounted, the lever 60' will normally hang suspended in the position shown in the drawings, and effectively prevent removal of the gauge member 58 by bearing against the notched portion 58a thereof.

Figure 1:
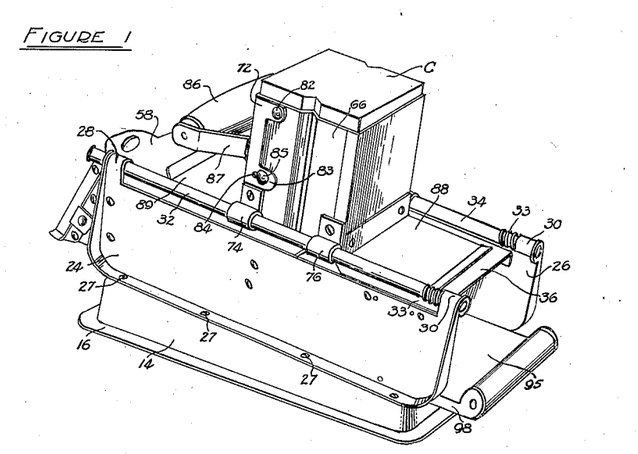
Fig. 1 is a front perspective view of my improved device, showing a loaf of cheese or a similar substance in the cutting hopper.
Figure 2:
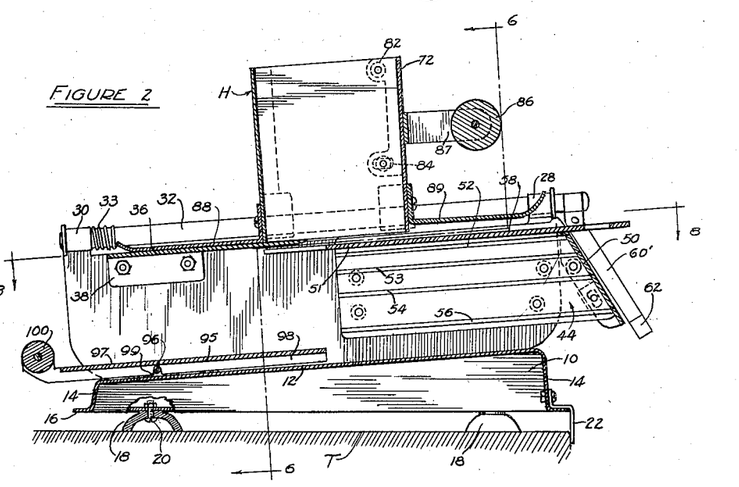
Fig. 2 is a longitudinal sectional view through the center thereof.
Figure 3:
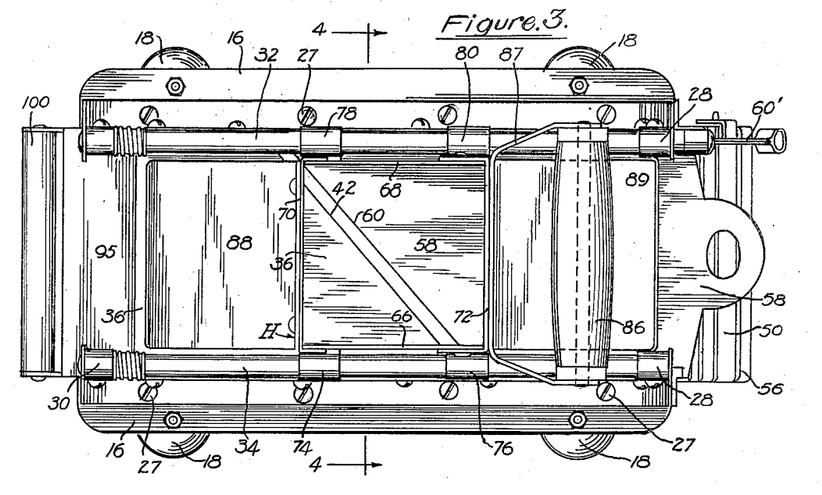
Fig. 3 is a plan view thereof.
Figure 4:
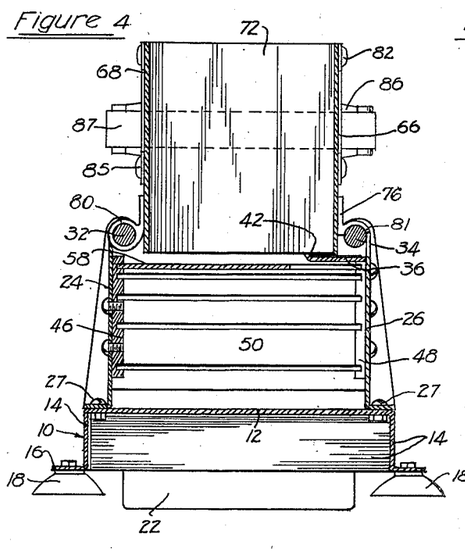
Fig. 4 is a vertical sectional view taken generally on the lines 4—4 of Fig. 3.
Figure 5:
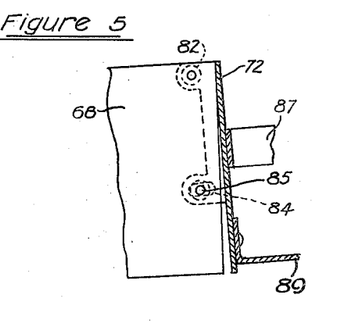
Fig. 5 is a fragmentary sectional view through the hopper illustrating one method of constructing a movable wall therein.
Figure 6:
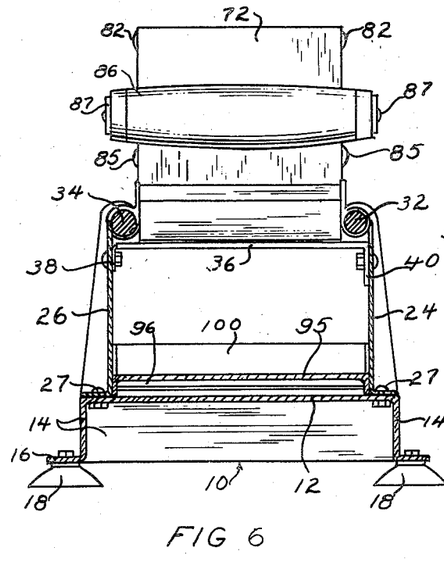
Fig. 6 is a vertical sectional view similar to Fig. 4, looking in an opposite direction, and is taken generally on the lines 6—6 of Fig. 2.
Figure 7:
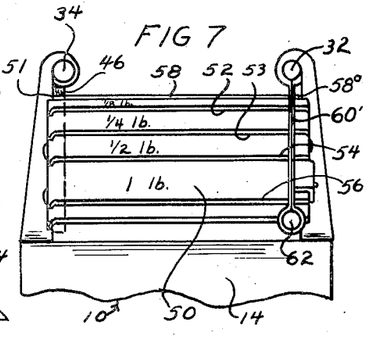
Fig. 7 is a fragmentary end view, showing the gauge and gauge support construction.
Figure 8:
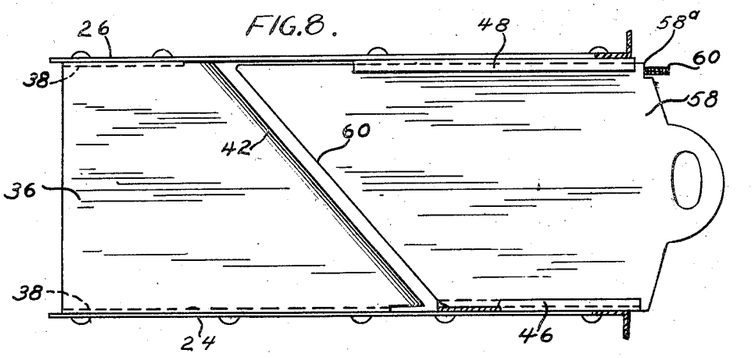
Fig. 8 is a fragmentary plan sectional view showing the gauge and cutter member and is taken generally on the line 8—8 of Fig. 2.

In connection with my improved cheese slicer, I provide a suitable hopper member H within which a loaf of cheese C may be positioned. The hopper may be of any desired shape or form and in the drawings I have shown numerous modifications thereof for supporting numerous different shapes of cheese, meat-loaf or other material which it is desired to slice. Accordingly, in the embodiment shown in Figure 1, the hopper may be formed with vertical side walls 66 and 68 and similar vertical front and back walls 70 and 72. The hopper, as thus constructed, has an open upper and lower end.

I provide a pair of bearing members 74 and 76 suitably secured to the hopper and mounted upon the upper rail 32 for reciprocatory movement. Upon the opposite side of the hopper I provide the bearing members 78 and 80 which engage upon the upper rail 34. These bearings are formed with semi-cylindrical flange portions 81 which serve to rest upon the rail 34 but do not prevent the removal of the hopper therefrom.

The forward wall 72 of the hopper may be pivotally mounted upon the side walls 66 and 68 upon suitable bolt members 82. As thus supported, the front wall is capable of movement inwardly or outwardly to increase or decrease the size of the hopper adjacent its lower end. I provide flanges 83 near the lower end of the side wall 72, formed with elongated openings 84 through which a bolt 85 is mounted. This is for the purpose of definitely limiting the extent to which the front wall 72 can be tilted.

For reciprocating the hopper upon the upper rails 32 and 34, I have provided a handle member 86 secured to the front wall of the hopper by a suitable bracket member 87.

I provide a pair of horizontally-extending plate members 88 and 89 secured to the front and rear wall of the hopper and adapted to act as guards to prevent injury to the hands or fingers of the operator of the device.

With the hopper as thus constructed, it can be seen that a loaf of cheese or other material can be placed in the hopper and by reciprocating the hopper to and fro upon the rail members, the cheese or other material will rest upon the gauge 58 and upon contact with the diagonal blade of the knife member 36 be sheared off.

I provide a receiving tray 95 positioned between the vertical walls 24 and 26 and supported upon the cross member 96. The tray may have an upper flat wall 97 and downwardly extending flanges 98 upon two sides thereof. Each of these flanges has a notch 99 capable of engaging the cross member 96 to fasten the tray in position during operation. For convenience in use, I have extended the tray beyond the edge of the machine and provided a handle 100 so that cheese or other material that has been sliced can be easily removed from the machine without touching the same with the hands.

In order to determine the size of the slice and to enable anyone to use the gauge 58 and the gauge holder 44, I have shown the indicia one-sixteenth ($\frac{1}{16}$), one-fourth ($\frac{1}{4}$) pound, one-half ($\frac{1}{2}$) pound, and one (1) pound upon the surface of the cross member 50 of the gauge holder.

The hopper is provided with the bearing shown so that the same can be easily tilted to the side for easy removal of the material placed therein to be cut. It will be obvious that without this function of the hopper, it will be practically impossible to remove a portion of a loaf of food material which had become so small that the upper end of the loaf does not extend beyond the upper edge of the hopper.

The purpose of providing the upper wall 12 of the base 10 at an angle as shown and constructing all of the mechanism positioned thereabove at the same angle is to permit a downward and forward push upon the hopper and against the knife during a slicing operation. Thus with everything at a slight downward angle as shown, greater ease of operation is insured. It is also much more convenient and the manipulation of the gauge and the other parts is possible with greater ease at this angle, than if the same were on a horizontal plan. In addition, the indicia upon the front of the gauge can be more easily observed.

In order to provide a resilient stop at the end of the movement of the hopper H I have shown a pair of spring members 33 adjacent the bearing members 28 and 30. This provides a smoother operation and eliminates any noise which may be caused by the striking of the hopper against the bearings 28 and 30.

Figures 9, 11:
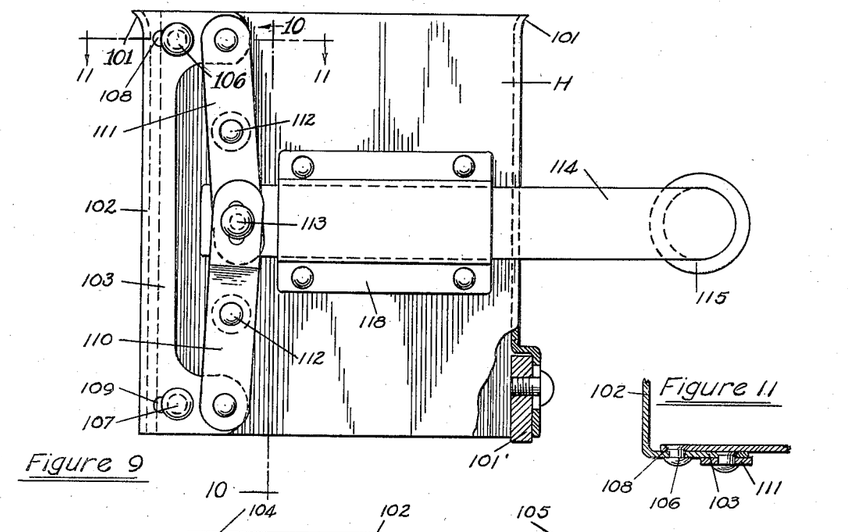
Fig. 9 is a side elevational view of a modified form of hopper.
Fig. 11 is a detailed section taken on the lines 11—11 of Fig. 9.
Figure 10:
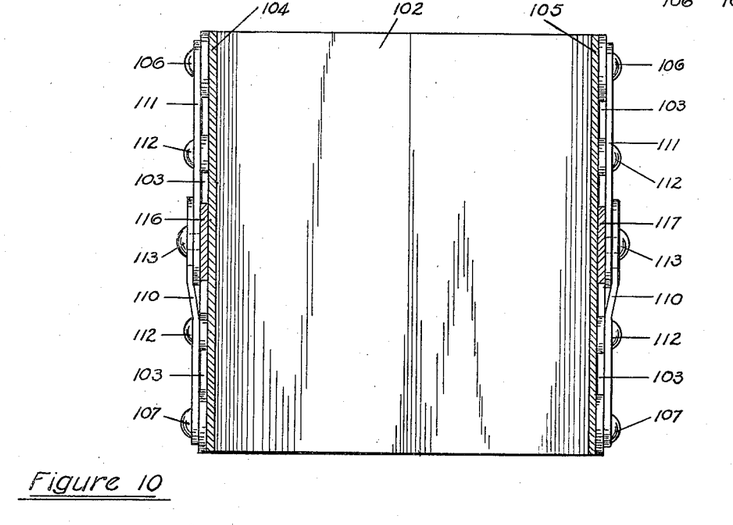
Fig. 10 is a vertical sectional view very fully taken on lines 10—10 of Fig. 9.

In Figs. 9 to 11 inclusive, I have shown a modified form of hopper H which is formed with the outwardly turned upper edges 101. This hopper may be formed with the movable rear wall 102 provided with flanges 103 formed about the edge of the side walls 104 and 105. The movable wall 102 is adapted to move upon suitable bolt members 106 and 107 mounted in the side walls and passing through elongated slots 108 and 109. Means for moving the end wall 102 forward against the edge of the hopper is provided in the form of a pair of toggle link members 110 and 111 pivotally mounted upon suitable pivots 112 and connected at one end to a bolt member 113 mounted in the end of handle member 114. The handle 114 may have a gripping portion 115 and the pair of parallel end members 116 and 117 which extend through suitable brackets 118 secured to the sides of the hopper H.

Thus in operation the hopper I have described has an end wall 102 which is movable forward against the loaf of cheese or other material that has been placed in the hopper and operates to bear against the same during the forward movement of the hopper because of the fact that the handle member 114 moves the bolt 113 forward, moving the toggle links 110 and 111 to draw in the end wall 102.

I have also shown a section 101' secured in the lower end of the forward wall 101 of the hopper. This member is adjustably fastened so that the lower edge of the hopper can be adjusted to barely clear the upper edge of the blade, thus insuring a positive and even thickness of slice up to the very end of the slice.

Figure 12:
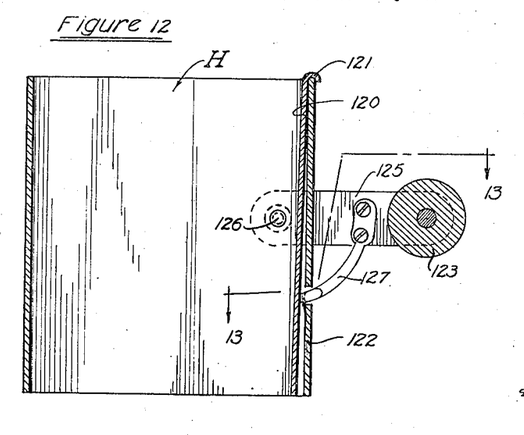
Fig. 12 is a vertical sectional view of a further modified form of hopper construction.
Figure 13:
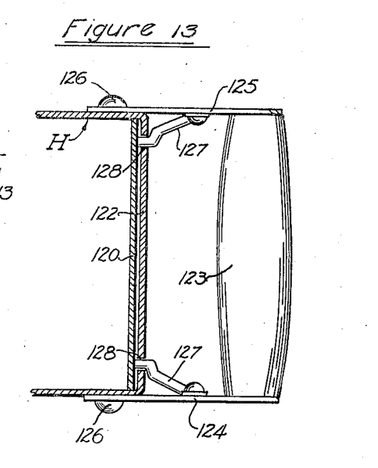
Fig. 13 is a fragmentary sectional view thereof taken generally on lines 13—13 of Fig. 12.

In Figs. 12 and 13 I have shown a still further modified form of the hopper H wherein I provide a movable forward wall 120 formed with the overhanging lip 121 supported over the upper edge of the forward wall 122 of the hopper. In this form of the invention I have shown a handle 123 formed with the end brackets 124 and 125 pivotally mounted at 126 upon the side walls of the hopper. Means for moving the lower edge of the movable wall 120 forward to engage the lower end of the loaf of cheese or other material are provided and comprise the finger members 127 secured to the brackets 124 and 125 and extending through suitable openings 128 in the forward wall 122. Thus forward and downward pressure upon the handle will move the wall 120 forward to frictionally grip the lower end of the loaf that is being sliced. Upon the return movement of the hopper H this wall will be released and permit the loaf to fall downward against the gauge to come into proper position for the next slicing operation.

Figure 14:
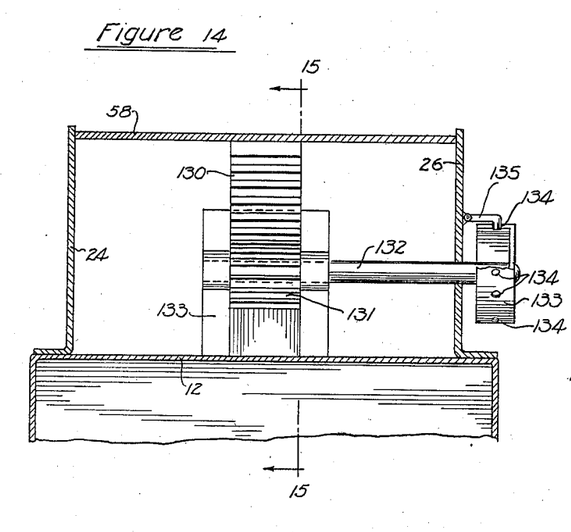
Fig. 14 is a cross-sectional view showing a modified form of gauge and gauge operating structure.
Figure 15:
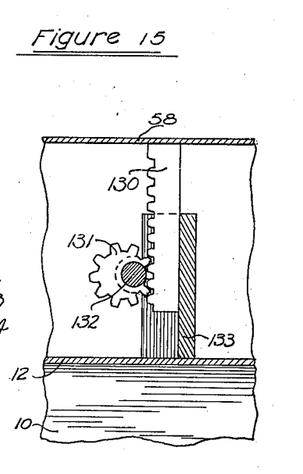
Fig. 15 is a fragmentary sectional view thereof taken generally on lines 15—15 of Fig. 14.

In Figs. 14 and 15 I have shown a mechanical means for adjusting the height of the gauge 58. In this form of the invention I have shown the vertical side walls 24 and 26 and the gauge member 58 provided with a vertical rack 130 extending downwardly therefrom.

This rack engages a suitable pinion 131 frictionally mounted upon the shaft 132 which is supported in a suitable frame member 133. The shaft 132 may extend through the side wall 26 and have a suitable handle member secured thereto. The handle member 133 is provided with indicia and a plurality of openings 134 adjacent to the indicia so that a stop member 135 that is pivotally mounted upon the vertical wall 26 may be dropped into any one of the openings 134 at the desired thickness of the slots.

Figure 16:
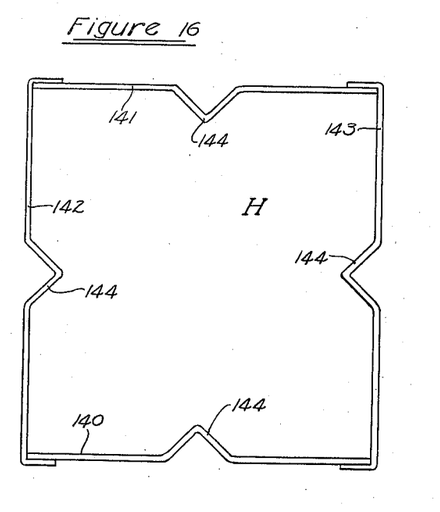
Fig. 16 is a plan view of a modified form of hopper adapted to receive a particular shape of loaf.
Figure 17:
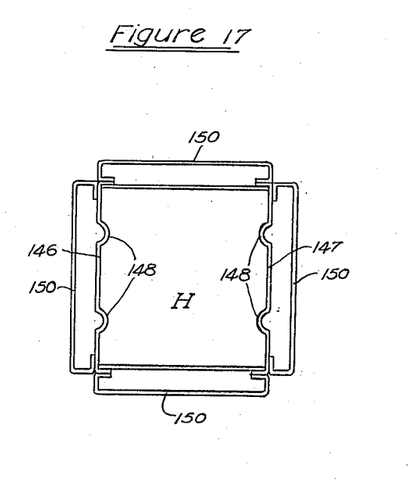
Fig. 17 is a similar view of a still further modified form showing refrigerator means associated therewith.

In Figs. 16 and 17 I have shown some modified forms of the hopper H which are provided with indentations or grooves to permit the slicing of a certain desired shape of material.

Accordingly, I provide thereon, rear walls 140 and 141 and the side walls 142 and 143 with triangular inwardly extended portions 144, which provides in effect a rectangular magazine or space with grooves in the side walls thereof. With this construction of hopper, it can be seen that a loaf capable of being inserted in the hopper must be provided with complementary grooves and it will be impossible to place a rectangular loaf without these grooves in the hopper. This is advisable where a certain company desires to make its product known by the use of a unique design of loaf.

In Fig. 17 I have shown a somewhat similar design of hopper except that I have provided the side walls 146 and 147 with the inwardly disposed groove portions 148. With this form of hopper, it will be apparent that a rectangular loaf must be provided with parallel groove portions to snugly fit within the hopper.

I have also found it advisable to provide means for controlling the temperature of material to be sliced. One form of this means must be constructed as shown in Fig. 17. Here I provide a plurality of pockets 150 secured to the side walls of the hopper. Each of these pockets may have a closed bottom and an open top. Dry ice, cracked ice, cold water or hot water or other heating or cooling means may be placed within the pockets 150 and may act as a temperature controlling means for the material to be sliced.

Figure 18:
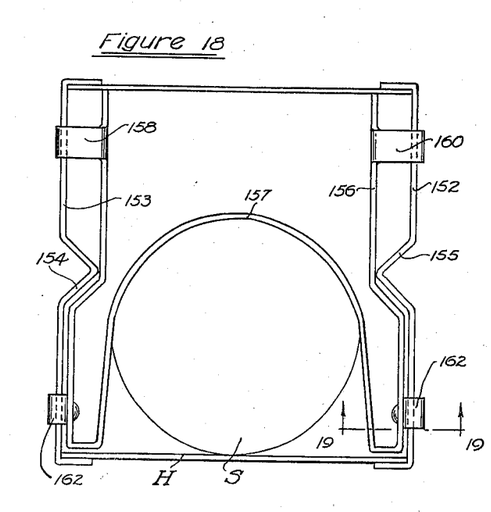
Fig. 18 is a plan elevational view of one form of hopper showing a removable member disposed therein for receiving round or similar articles to be sliced.
Figure 19:
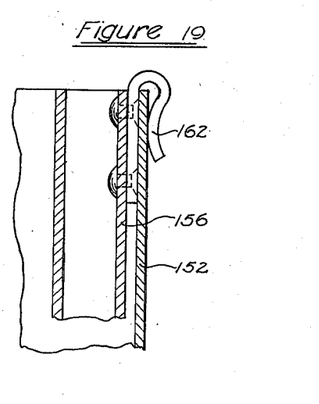
Fig. 19 is an enlarged detailed view of a portion thereof taken generally on the line 19—19 of Fig. 18.

In Figs. 18 and 19 I have shown a still further form of hopper H provided with the side walls 152 and 153 formed with inwardly extending groove portions 154 and 155. In order to slice sausages or similarly shaped materials I provide a dummy hopper 156. This member may be formed with a suitable strap member capable of encircling a sausage S or similar material. The dummy hopper may further be provided with outwardly extending flange members 158 and 160 capable of overlying the upper ends of the side walls of the hopper.

To fasten the dummy hopper in position in the hopper I provide a spring clip member 162 capable of being snapped over the upper edge of the upper wall to effectively hold the dummy hopper in position. It will be obvious that the shape of the enclosure desired in the dummy hopper may be varied and that numerous odd shaped objects may be supported therein for the purpose of slicing the same.

While I have illustrated and described a specific embodiment of my invention and various modified constructions, it will be apparent to those skilled in the art that many other modifications thereon can be made without departing from the invention and I do not wish to be limited in any particular. Rather, what I desire to secure and protect by Letters Patent of the United States is:

1. In a slicing machine the combination of a frame, parallel horizontal rail members adjacent the upper end thereof, a cutter member therein positioned adjacent said rails, said cutter member having a diagonal blade, a removable gauge member, said gauge member having a diagonal forward edge, a plurality of spaced slots in the forward end of said frame, said slots adapted to receive said gauge member, gravity operated means for locking said gauge member in any of said slots, a vertically disposed hopper journalled upon one of said rail members, said hopper having means resting upon the other of said rail members, and knife guards secured to said hopper, said hopper having a movable wall whereby forward pressure of said hopper during a slicing operation functions to securely grip material therein adjacent its lower end to hold the same during a slicing operation.

2. In a slicing machine the combination of a frame, parallel horizontal rail members adjacent the upper end thereof, a cutter member therein horizontally positioned adjacent said rails, said cutter member having a diagonal blade, a removable gauge member, said gauge member having a diagonal forward edge, a plurality of spaced slots in the forward end of said frame, said slots adapted to receive said gauge member, gravity operated means comprising a pivotally mounted weight for locking said gauge member in any of said slots, a vertically disposed hopper journalled upon one of said rail members, said hopper having means including a pair of brackets resting upon the other of said rail members, and knife guards secured to said hopper, said hopper having a movable wall whereby forward pressure of said hopper during a slicing operation functions to securely grip material therein adjacent its lower end to hold the same during a slicing operation.

3. In a slicing machine the combination of a frame, suction feet on said frame, parallel horizontal rail members adjacent the upper end thereof, a horizontally disposed cutter member herein positioned adjacent said rails, said cutter member having a diagonal blade, a removable horizontal gauge member, said gauge member having a diagonal forward edge, a plurality of spaced slots in the forward end of said frame, indicia adjacent each of said slots, said slots adapted to receive said gauge member, gravity operated means for locking said gauge member in any of said slots, a vertically disposed hopper journalled upon one of said rail members, and movable to and fro thereon, said hopper having means resting upon the other of said gauge members and horizontal knife guards secured to said hopper, said hopper having a movable wall whereby forward pressure of said hopper during a slicing operation functions to securely grip material therein adjacent its lower end to hold the same during a slicing operation.

4. Apparatus for slicing solid materials, comprising a frame having upper horizontal parallel rails, a cutting member having an edge diagonally positioned between said rails, a movable gauge member for determining the thickness of slices, gravity operated means for holding said gauge in a pre-determined position, a hopper mounted on said rails, said hopper being capable of being tilted to permit access to the lower side thereof and movable means associated with said hopper for gripping the lower portion of material being sliced.

5. Apparatus for slicing solid materials, comprising a frame having upper horizontal parallel rails, a horizontally disposed cutting member having an edge diagonally positioned between said rails, a horizontal movable gauge member for determining the thickness of slices, gravity operated means for holding said gauge in a pre-determined position, a vertical hopper mounted on said rails, said hopper being capable of being tilted to permit access to the lower side thereof and movable means associated with said hopper for gripping the lower portion of material being sliced.

6. Apparatus for slicing solid materials, comprising a frame having upper horizontal parallel rails, a cutting member having an edge diagonally positioned between said rails, a movable gauge member for determining the thickness of slices, gravity operated means for holding said gauge in a determined position, a hopper having a plurality of vertical side walls mounted on said rails, said hopper being capable of being tilted to permit access to the lower side thereof and movable means including one of said side walls associated with said hopper for gripping the lower portion of material being sliced.

7. Apparatus of the class described comprising a base member, having an angularly disposed upper side, a pair of parallel side walls vertically positioned thereon, a cutter member secured between said side walls, a pair of rail members on said side walls, a movable hopper slidably mounted on said rail members, said hopper having a movable wall, a handle secured thereto and a gauge member movably positioned between said side walls so arranged that the thickness of a slice of material placed in said hopper may be determined before a slicing operation.

8. Apparatus of the class described comprising a base member, having an angularly disposed upper side, a pair of parallel side walls vertically positioned thereon, a horizontal cutter member secured between said side walls, a pair of rail members on said side walls, a vertical hopper slidably mounted on said rail members, said hopper having a movable wall, a handle secured thereto, a gauge member movably positioned between said side walls so arranged that the thickness of a slice of material placed in said hopper may be determined before a slicing operation, and means for adjusting said gauge member to change the thickness of said slices.

9. Apparatus of the class described comprising a base member, having an angularly disposed upper side nearly horizontal, a pair of parallel side walls vertically positioned thereon, a horizontal cutter member secured between said side walls, a pair of rail members on said side walls, a movable hopper slidably mounted on said rail members, said hopper having a movable wall, a handle secured thereto, a gauge member movably positioned between said side walls so arranged that the thickness of a slice of material placed in said hopper may be determined before a slicing operation and a receiving platform positioned on said base member between said side walls.

10. Apparatus for slicing cheese from a loaf, comprising a base, suction feet on said base, means on one side for supporting said base against a vertical wall, a frame on said base, parallel rails adjacent the upper sides of said frame, a movable cheese hopper having brackets journalled on one of said rails, open-ended brackets on the opposite side of said hopper for riding on the other of said rails, a gauge in said frame and a cutting member positioned in the path of movement of said hopper.

11. Apparatus for slicing cheese from a loaf, comprising a base, suction feet on said base, means on one side for supporting said base against a vertical wall, a frame on said base, parallel rails adjacent the upper sides of said frame, a movable cheese hopper having brackets journalled on one of said rails, open-ended brackets on the opposite side of said hopper for riding on the other of said rails, a gauge in said frame means for changing the position of said gauge and a cutting member positioned in the path of movement of said hopper.

12. Apparatus for slicing cheese from a loaf, comprising a base, suction feet on said base, means on one side for supporting said base against a vertical wall, a frame on said base, parallel horizontal rails adjacent the upper sides of said frame, a movable cheese hopper, vertical side walls thereon, said walls having brackets journalled on one of said rails, open-ended brackets on the opposite side of said hopper for riding on the other of said rails, a horizontal gauge in said frame, means for locking said gauge during a cutting operation, and a cutting member positioned in the path of movement of said hopper.

13. In apparatus of the class described, a movable hopper having upright vertical walls, a fixed knife member, knife guards extending forward and back therefrom adjacent the lower end of said walls, one of said walls being movable, a handle for moving said hopper over a fixed knife member, and a toggle-link member, said handle being attached to said movable wall, and to said toggle-link member.

14. In apparatus of the class described a hopper, said hopper having a plurality of vertical side walls, several of said side walls being pivotally mounted to permit increasing or decreasing the size thereof and several side walls having inwardly disposed formations to permit the reception of a loaf of cheese or other material having similar inwardly disposed indentations.

GEORGE W. SPOUSTA.